(12) United States Patent
Leong et al.

(10) Patent No.: US 12,287,223 B2
(45) Date of Patent: Apr. 29, 2025

(54) TRANSFORMING SCALE RING

(71) Applicant: Google LLC, Mountain View, CA (US)

(72) Inventors: Su Chuin Leong, Oakland, CA (US); Alistair Milne, Seattle, WA (US); Christopher Milan Raykovich, Seattle, WA (US); Demi Boe, Burlingame, CA (US); Luke Weijia Xu, Wayland, MA (US); Ashley Surdin Proctor, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/220,382

(22) Filed: Jul. 11, 2023

(65) Prior Publication Data
US 2023/0349713 A1 Nov. 2, 2023

Related U.S. Application Data

(63) Continuation of application No. 17/281,155, filed as application No. PCT/US2019/057818 on Oct. 24, 2019, now Pat. No. 11,733,057.

(51) Int. Cl.
*G01C 21/36* (2006.01)
*G09B 29/10* (2006.01)

(52) U.S. Cl.
CPC ......... *G01C 21/367* (2013.01); *G09B 29/106* (2013.01)

(58) Field of Classification Search
None
See application file for complete search history.

(56) References Cited

U.S. PATENT DOCUMENTS

| | | |
|---|---|---|
| 6,933,860 B1 | 8/2005 | Gehman |
| 7,548,814 B2 | 6/2009 | Pantalone et al. |
| 9,939,271 B1 | 4/2018 | Foster et al. |
| 2009/0271105 A1 | 10/2009 | Kindo et al. |
| 2011/0246065 A1 | 10/2011 | Spencer, V |
| 2013/0325342 A1 | 12/2013 | Pylappan et al. |

(Continued)

FOREIGN PATENT DOCUMENTS

| | | |
|---|---|---|
| DE | 10046000 A1 | 5/2001 |
| EP | 3112809 A1 | 1/2017 |

(Continued)

OTHER PUBLICATIONS

Apple Maps publicly available at least as of Jan. 7, 2020, 1 page.
(Continued)

*Primary Examiner* — Peter Hoang
(74) *Attorney, Agent, or Firm* — Lerner David LLP

(57) ABSTRACT

A method for providing a map scale, using a computing device having one or more processors, comprising providing a geographic area for display on a display of a device, receiving information corresponding to a first input associated with a geographic location within the geographic area, providing, in response to the information and for display on the display, a scale including a first graphic and a second graphic surrounding the geographic location, calculating a distance between the first graphic and the second graphic, and providing a reference value for display on the display, the reference value including at least one of a time or distance to travel between the first and second graphics of the scale, the time or distance to travel being based on the calculated distance.

20 Claims, 9 Drawing Sheets

(56) References Cited

U.S. PATENT DOCUMENTS

| | | | |
|---|---|---|---|
| 2016/0131498 | A1 | 5/2016 | Rosekrans |
| 2017/0038218 | A1 | 2/2017 | Kamata |
| 2017/0103342 | A1 | 4/2017 | Rajani et al. |
| 2019/0186946 | A1 | 6/2019 | Liu |

FOREIGN PATENT DOCUMENTS

| | | |
|---|---|---|
| JP | H06109828 A | 4/1994 |
| JP | 2012058632 A | 3/2012 |
| JP | 5639422 B2 | 12/2014 |
| JP | 5662614 B1 | 2/2015 |

OTHER PUBLICATIONS

Decision of Rejection and Decision to Reject the Amendments for Japanese Patent Application No. 2020-559373 dated Apr. 3, 2023. 4 pages.
First Examination Report for Indian Patent Application No. 202027039164 dated May 30, 2022. 7 pages.
Google Maps publicly available at least as of Oct. 7, 2019, 1 page.
International Preliminary Report on Patentability for International Application No. PCT/US2019/057818 dated May 5, 2022. 10 pages.
International Search Report and Written Opinion for International Application No. PCT/US2019/057818 dated Jul. 9, 2020. 16 pages.
Office Action for Japanese Patent Application No. 2020-559373 dated Feb. 14, 2022. 3 pages.
Office Action for Japanese Patent Application No. 2020-559373 dated Sep. 20, 2022. 4 pages.
Office Action for Korean Patent Application No. 10-2020-7030675 dated Feb. 24, 2022. 4 pages.
Office Action for Korean Patent Application No. 10-2020-7030675 dated Mar. 27, 2023. 3 pages.
Office Action for Korean Patent Application No. 10-2020-7030675 dated Sep. 26, 2022. 4 pages.
Office Action for Korean Patent Application No. 10-2020-7030675 dated Nov. 9, 2023. 4 pages.
Notice of Allowance for Korean Patent Application No. 10-2023-7037014 dated Jul. 18, 2024. 3 pages.
Notice of Allowance for Chinese Patent Application No. 201980027976.9 dated Jun. 28, 2024. 4 pages.
First Office Action for Chinese Application No. 201980027976.9 dated Mar. 15, 2014. 17 pages.
Communication Pursuant to Article 94(3) EPC for European Patent Application No. 19804961.1 dated Nov. 6, 2024. 7 pages.
Data Visualization For Fun. How to Draw A Circle Using Google Earth—Google Earth Pro. Jul. 31, 2017 (Jul. 31, 2017), Retrieved from the Internet: [retrieved on Oct. 30, 2024] <https://www.youtube.com/watch?v=DsaqR7HCaz8>. 2 pages.

TRANSFORMING SCALE RING

CROSS-REFERENCE TO RELATED APPLICATIONS

The present application is a continuation of U.S. patent application Ser. No. 17/281,155 filed Mar. 29, 2021, which is a national phase entry under 35 U.S.C. § 371 of International Application No. PCT/US2019/057818 filed Oct. 24, 2019, the entire disclosures of which are incorporated herein by reference.

BACKGROUND

Map scales are traditionally used to convey geographic distance on a map by converting a length displayed on the map to a geographic distance. For instance, a scale can depict 1 inch of map length as corresponding to 1 mile of travel distance. Where a map is displayed on a screen of an electronic device, the ratio of map distance to geographic distance can be a ratio of screen pixels to geographic distance.

Current methods for displaying map scales involve depicting a linear scale with markings along its length; each marking defining a graphic along the scale to represent a certain geographic distance, such as 1 mile for every marked graphic of the scale. In this manner, a user reading a map can approximate the geographic distance by comparing a map length between two given locations with the number of scale graphics required to traverse the locations.

However, this current method of displaying map scales poses a number of challenges. First, the linear nature of current map scales does not allow for the geographic distance to be efficiently approximated since travel routes rarely go in a perfectly straight line. In this regard, it may be difficult to convert a map length to a geographic distance using a traditional linear scale due to the number of twists and turns encountered along a travel route. Such non-linearity may lead to inaccurate approximations of the actual travel distance. Second, comparing multiple destinations from a central location compounds the above deficiency of current methods for displaying map scales as doing so requires repeating the same unintuitive and inefficient conversions of map length to geographic distance conversion for each destination.

Moreover, current methods of displaying map scales include placing those scales in static locations on the map, such as a bottom corner of the map. The placement of the scale in the static location makes it difficult to determine the distance between locations at areas on the map away from the scale. Further, the scale remains in the same location regardless of changes to the map being displayed.

BRIEF SUMMARY

The present disclosure provides a system and method of displaying a map scale that can more efficiently and intuitively convey information upon an input. The present disclosure also provides an improved estimation of a speed of travel of a computing device to facilitate more effective conveyance of said information on a display of the computing device. One aspect of the disclosure provides for a method using one or more processors. The method may include: providing a geographic area for display on a display of a device, receiving information corresponding to a first input associated with a geographic location within the geographic area, providing, in response to the information and for display on the display a scale including a first graphic and a second graphic surrounding the geographic location, calculating a distance between the first graphic and the second graphic, and providing a reference value for display on the display, the reference value including at least one of a time or distance to travel between the first and second graphics of the scale, the time or distance to travel being based on the calculated distance. In other aspects, the information may include a request for an updated geographic area, and the method further includes providing the updated geographic area for display on the display of the device, wherein the scale surrounds the geographic location within the updated geographic area. In other aspects, the second graphic may be a ring and the second graphic surrounds the first graphic concentrically. In other aspects, the first graphic may be positioned at a center of the geographic location. In other aspects, the reference value may be the time to travel, and determining the reference value includes determining a speed of travel, and determining an estimated time to travel between the first graphic and the second graphic based on the speed of travel, wherein the reference value may be the estimated time to travel. In other aspects, the method may further comprise receiving information corresponding to a second input associated with a second geographic location within the geographic area, providing, in response to the information corresponding to the second input and for display on the display, a second scale including a first graphic and a second graphic surrounding the second geographic location, calculating a distance between the first graphic and the second graphic of the second scale, and providing an updated reference value for display on the display, the updated reference value including at least one of a time or distance to travel between the first and second rings of the second scale, the time or distance to travel between the first and second graphics of the second scale being based on the calculated distance between the first graphic and the second graphic of the second scale. In other aspects, the scale and reference value may be configured to fade out over a period of time. In other aspects, the scale and reference value may be configured to cease being displayed on the display after a period of time. In other aspects, determining a speed of travel may comprise determining a speed of travel based on data associated with a user of the device. In other aspects, determining a speed of travel may be based on data associated with a user of the device comprises applying a machine learning model to the data associated with the user of the device to generate the speed of travel.

Another aspect of the disclosure provides for a system that includes memory configured to store at least one of instructions or data, and one or more processors operatively coupled to the memory, the one or more processors being configured to: provide a geographic area for display on a display of a device, receive information corresponding to a first input associated with a geographic location within the geographic area, provide, in response to the information and for display on the display, a scale including a first graphic and a second graphic surrounding the geographic location, calculate a distance between the first graphic and the second graphic, and provide a reference value for display on the display, the reference value including at least one of a time or distance to travel between the first and second graphics of the scale, the time or distance to travel being based on the calculated distance. In other aspects, the information may include a request for an updated geographic area, and the one or more processors are further configured to provide the updated geographic area for display on the display, wherein the scale surrounds the geographic location within the updated geographic area. In other aspects, the second graphic may be a ring and the second graphic surrounds the first graphic concentrically. In other aspects, the first graphic may be positioned at a center of the geographic location. In other aspects, the reference value may be the time to travel, and determining the reference value includes determining a speed of travel, and determining an estimated time to travel between the first graphic and the second graphic based on the speed of travel, wherein the reference value may be the estimated time to travel. In other aspects, the one or more processors may be further configured to receive information corresponding to a second input associated with a second geographic location within the geographic area, provide, in response to the information corresponding to the second input and for display on the display, a second scale including a first graphic and a second graphic surrounding the second geographic location, calculate a distance between the first graphic and the second graphic of the second scale, and provide an updated reference value for display on the display, the updated reference value including at least one of a time or distance to travel between the first and second graphics of the second scale, the time or distance to travel between the first and second rings of the second scale being based on the calculated distance between the first graphic and the second graphic of the second scale. In other aspects, the scale and reference value may be configured to fade out over a period of time. In other aspects, the scale and reference value may be configured to cease being displayed on the display after a period of time.

A yet further aspect of the disclosure provides for a non-transitory computing-device readable medium storing instructions, which when executed by one or more processors, cause the one or more processors to: provide a geographic area for display on a display of a device, receive information corresponding to a first input associated with a geographic location within the geographic area, provide, in response to the information and for display on the display, a scale including a first graphic and a second graphic surrounding the geographic location, calculate a distance between the first graphic and the second graphic, and provide a reference value for display on the display, the reference value including at least one of a time or distance to travel between the first and second graphics of the scale, the time or distance to travel being based on the calculated distance. In other aspects, the information may include a request for an updated geographic area, and the instructions further cause the one or more processors to provide the updated geographic area for display on the display, wherein the scale surrounds the geographic location within the updated geographic area. In other aspects, the second graphic may be a ring and the second graphic surrounds the first graphic concentrically. In other aspects, the reference value may be the time to travel, and determining the reference value includes determining a speed of travel, and determining an estimated time to travel between the first graphic and the second graphic based on the speed of travel, wherein the reference value may be the estimated time to travel. A computer program comprising instructions that, when executed by one or computing apparatus, cause it or them to perform any of the methods described herein is also provided.

DETAILED DESCRIPTION

Overview

Figure 1:
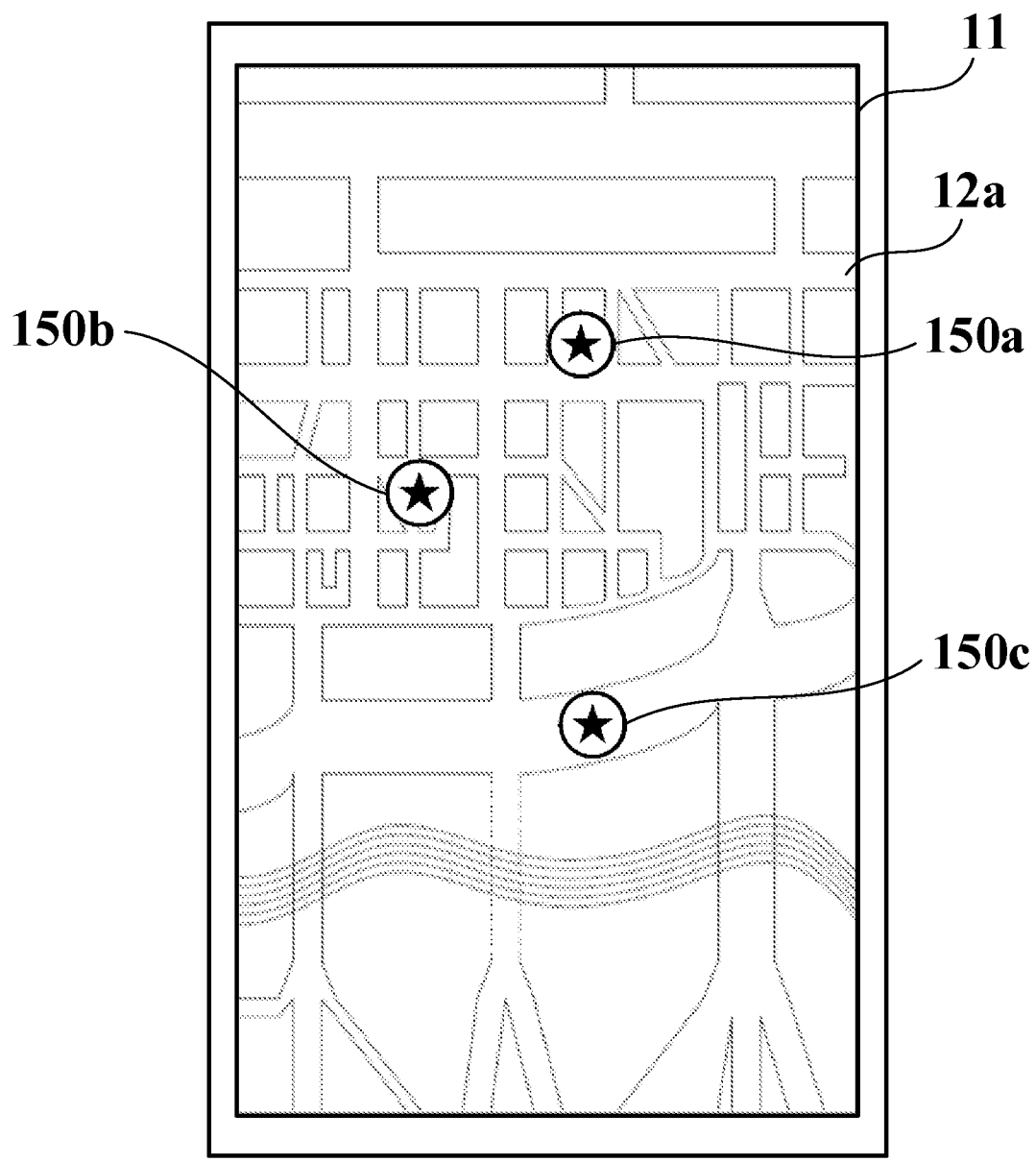
FIG. 1 an example screenshot of a map in accordance with aspects of the disclosure.

This technology is directed to displaying a scale ring over a map to provide an indication of the time or distance it would take to travel to locations on the map to improve approximation of a travel distance or time for a user. For example, a map may be displayed on a computing device, such as map 12a on a display 11 of computing device 10 in FIG. 1. The computing device 10 may receive an input requesting the map be adjusted or a new map be displayed. In response, the computing device 10 may output an updated map, such as new map 12b on the display, as shown in FIG. 2. A scale ring 100 may be displayed on the new map 12b. The scale ring 100 may include an inner graphic 110 and outer graphic 120.

The scale ring 100 may include a reference value. The reference value, such as reference value 130, may provide information corresponding to, or related to, the distance between the inner graphic 110 and outer graphic 120. For example, reference value 130 in FIG. 2 shows the time it would take 5 minutes to walk from inner graphic 110 to outer graphic 120. The reference value 130 may display other values in addition to, or in lieu of a walking distance, such as the distance from the inner graphic 110 to the outer graphic 120 or the estimated time it would take to travel by running, driving, taking public transportation, or the like, from the inner graphic to the outer graphic 120. Public transportation may include taking the bus, flying on an airplane, riding on a ship, riding on a subway, or the like. In some instances, the reference value 130 may include multiple values, such as a travel time and distance.

The scale ring may adjust as new maps are displayed. In this regard, the scale ring may be adjusted to be centered on a current location of a device, such as computing device 10. In some instances, the scale ring may be centered at a location based on an input, such as a user input. In this regard, the scale ring may be displayed such that the inner graphic 110 is not centered on a display.

The scale ring may only be displayed on the map for a period of time. For instance, after receiving an input, the scale ring may be displayed for a certain amount of time before it is minimized, faded, or otherwise removed to reduce screen clutter and resource usage. The scale ring may be displayed when prompted, such as through receiving an input or an update being made to the map.

As described herein, scales are typically linear in nature. Accordingly, it is difficult to determine an accurate, efficient approximation of the distance and time required to travel between two geographic locations due to the non-linear nature of typical travel routes between locations. Additionally, the static positioning of scales makes it difficult to determine the distance between locations at areas on the map away from the scale. By providing a scale ring that encircles a portion of a map and displays information corresponding to the distance between the inner (or first) graphic and outer (or second) graphic, information between points on a map can be more readily approximated by a user. This approximation between points may be based on the points' respective positions relative to the inner and outer graphic, and irrespective of the linearity of a route between the points. Moreover, the position of the scale ring may be displayed corresponding to an input so that the scale ring can consistently provide efficient time and distance approximation irrespective of any map change displayed in response to the input, such as a pan or zoom of the map or a selection of a location on the map. In this way, the inner or first graphic may be positioned at a point on the map different to a current location of the computing device, which may facilitate improved approximation of the distance and time required to travel between two geographic locations.

Example Systems

Figure 3:
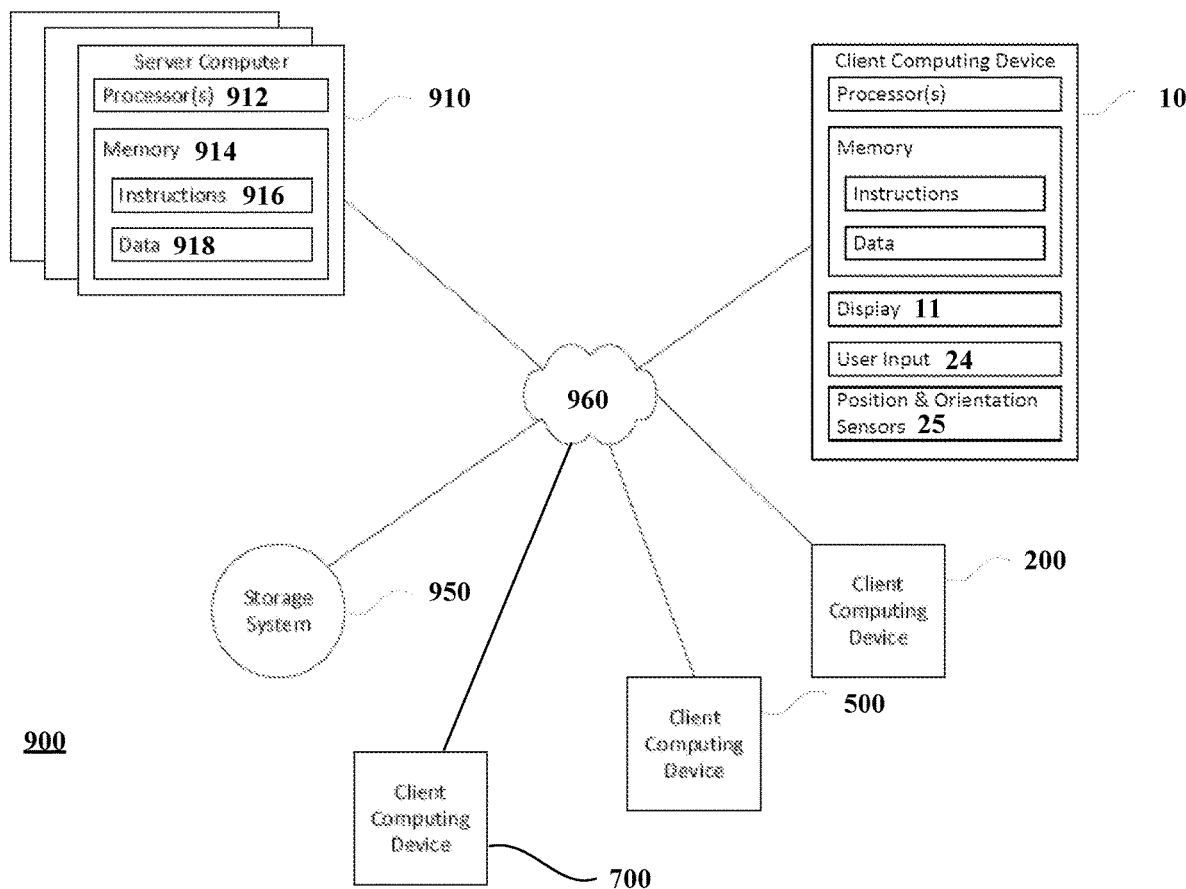
FIG. 3 is a functional diagram of an example system in accordance with aspects of the disclosure.
Figure 4:
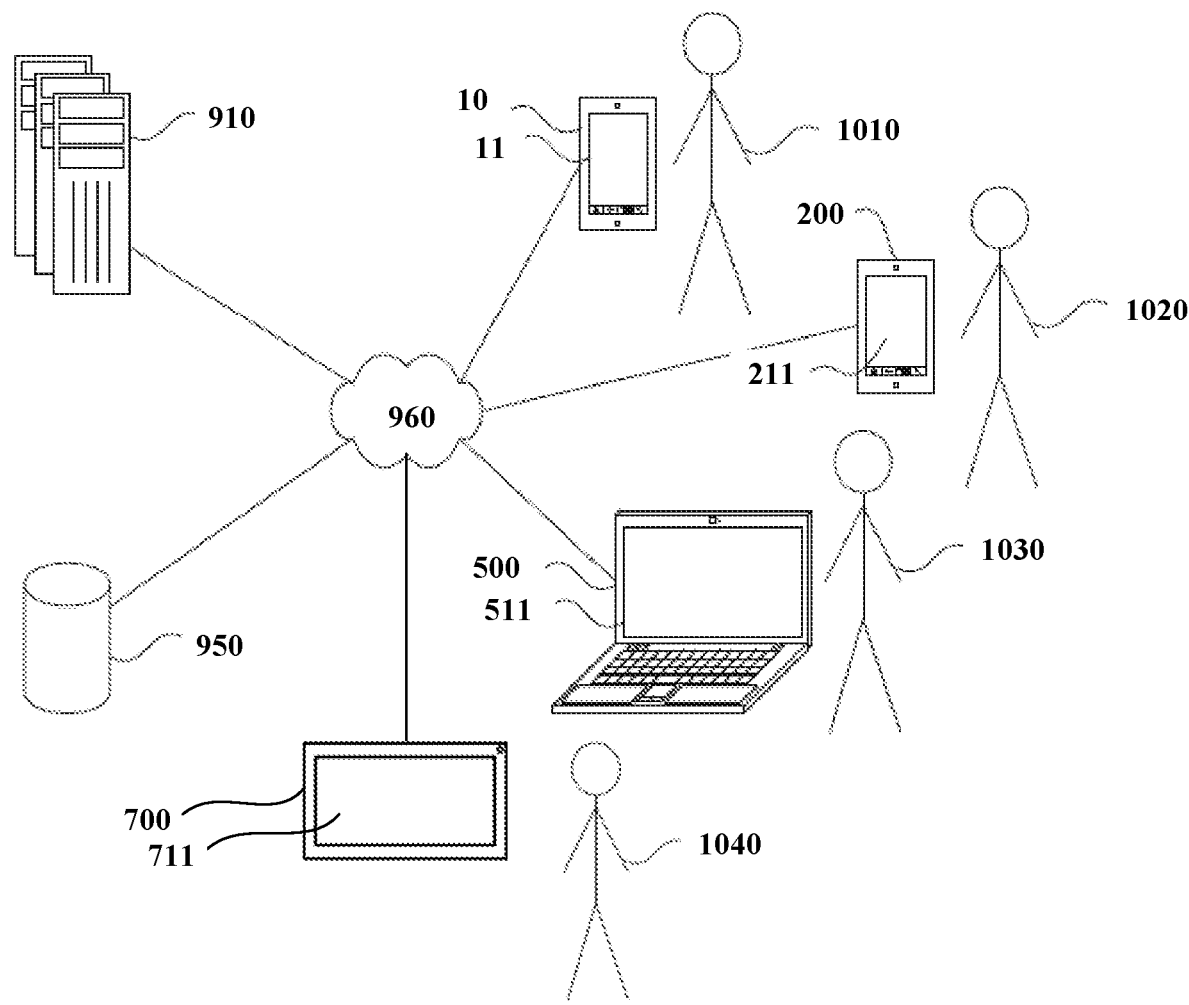
FIG. 4 is a pictorial diagram of the example system of FIG. 1.

FIGS. 3-4 show an example system 900 in which the features described herein may be implemented. It should not be considered as limiting the scope of the disclosure or usefulness of the features described herein. In this example, system 900 may include server computing device 910 and client computing devices 10, 200, 500, 700 (collectively "computing devices") as well as storage system 950. Server computing device 910 may contain one or more processors 912, memory 914 and other components typically present in general purpose computing devices.

Memory 914 of server computing device 910 may store information accessible by the one or more processors 912, including instructions 916 that can be executed by the one or more processors 912. The memory 914 may also store data 918 that can be retrieved, manipulated or stored by one or more processors. The memory 914 may be of any non-transitory type capable of storing information accessible by the processor, such as a hard-drive, memory card, ROM, RAM, DVD, CD-ROM, a tape drive, write-capable, and read-only memories.

The instructions 916 may be any set of instructions to be executed directly, such as machine code, or indirectly, such as scripts, by the one or more processors. In that regard, the terms "instructions," "kernels," "applications," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 918 may be retrieved, stored, and modified by the one or more processors 912 in accordance with the instructions 916. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 912 can be any conventional processors, such as a commercially available CPU. Alternatively, the processors can be dedicated components such as an application specific integrated circuit ("ASIC") or other hardware-based processor. Although not necessary, server computing device 910 may include specialized hardware components to perform specific computing processes, such as decoding video, matching video frames with images, distorting videos, encoding distorted videos, etc. faster or more efficiently.

Although FIG. 3 functionally illustrates the processor, memory, and other elements of server computing device 910 as being within the same block, the processor, computer, computing device, or memory can actually comprise multiple processors, computers, computing devices, or memories that may or may not be stored within the same physical housing. For example, memory 914 can be a hard drive or other storage media located in housings different from that of server computing device 910. Accordingly, references to a processor, computer, computing device, or memory will be understood to include references to a collection of processors, computers, computing devices, or memories that may or may not operate in parallel. For example, server computing device 910 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 960.

Figure 5:
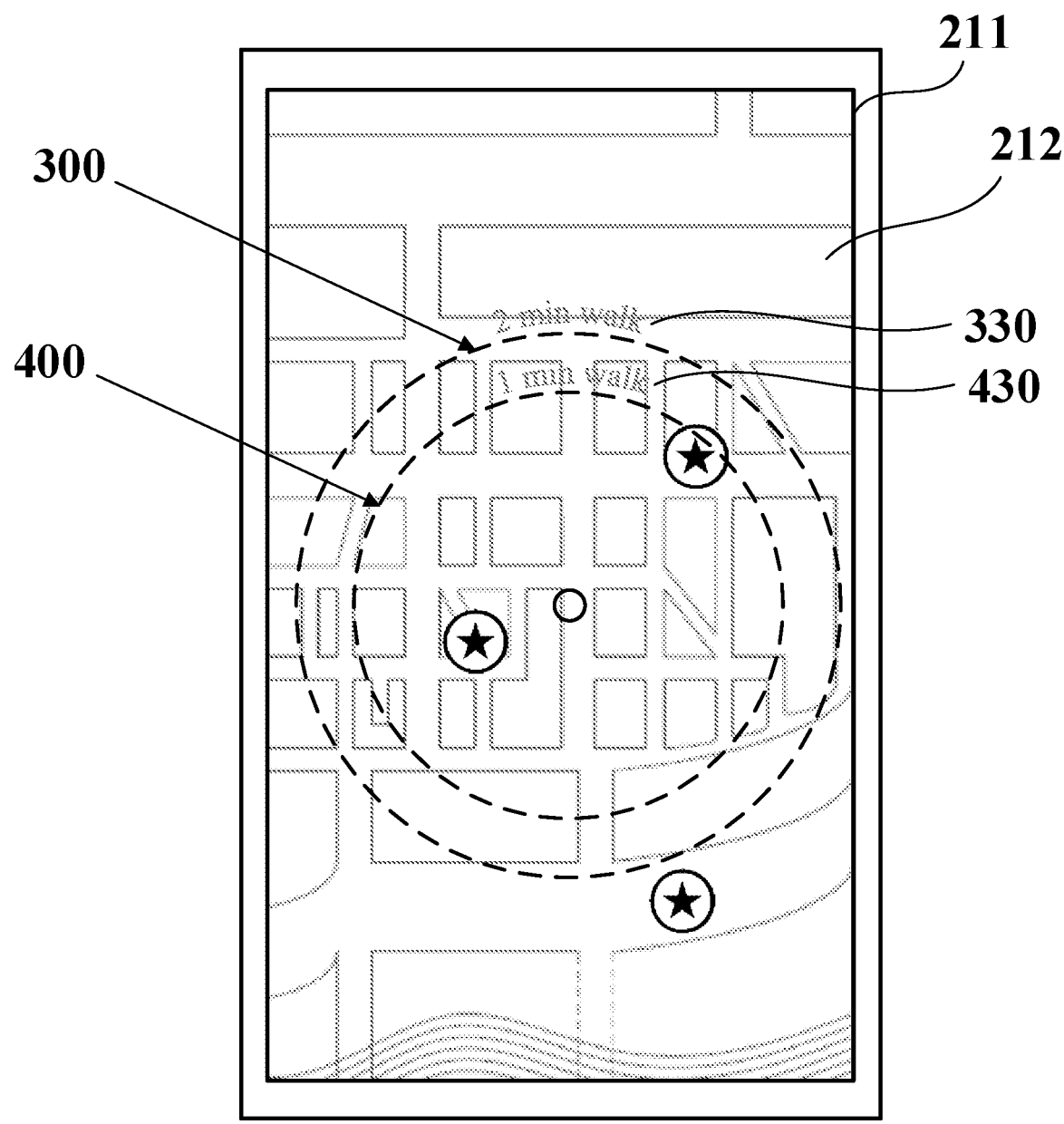
FIG. 5 is a screenshot depicting an example transition of a scale ring according to aspects of the disclosure.

Each of the computing devices 10, 200, 500, 700, 910 can be at different nodes of a network 960 and capable of directly and indirectly communicating with other nodes of network 960. Although only a few computing devices 10, 200, 500, 700, 910 are depicted in FIGS. 3-5, it should be appreciated that a typical system can include a large number of connected computing devices, with each different computing device being at a different node of the network 960.

Network 960 and intervening nodes described herein can be interconnected using various protocols and systems, such that the network can be part of the Internet, World Wide Web, specific intranets, wide area networks, or local networks. The network can utilize standard communications protocols, such as Ethernet, Wi-Fi and HTTP, protocols that are proprietary to one or more companies, and various combinations of the foregoing. For instance, two or more computing devices, such as computing devices 10, 200, 500, 700, 910, may communicate through a peer-to-peer communication protocol, with or without the use of an intermediate server. Although certain advantages are obtained when information is transmitted or received as noted above, other aspects of the subject matter described herein are not limited to any particular manner of transmission of information.

As an example, server computing device 910 may include web servers capable of communicating with storage system 950 as well as the other computing devices 10, 200, 500, and 700 via network 960. For example, server computing device 910 may use network 960 to transmit and present information to a user, such as user 1010, 1020, 1030, 1040, on a display, such as displays 11, 211, 511, 711 of computing devices 10, 200, 500, 700. In this regard, computing devices 10, 200, 500, 700 may be considered client computing devices, and may perform all or some of the features described herein.

Each of the client computing devices 10, 200, 500, 700 may be configured similarly to server computing device 910, with one or more processors, memory, data, and instructions as described above. As such, client computing devices 10, 200, 500, 700 may perform all of the steps described herein without communicating with server computing device 910. Each client computing device 10, 200, 500, 700 may be a personal computing device intended for use by a user 1010, 1020, 1030, 1040, and have all of the components normally used in connection with a personal computing device such as a central processing unit (CPU), memory (e.g., RAM and internal hard drives) storing data and instructions, a display such as displays 11, 211, 511, 711 (e.g., a monitor having a screen, a touch-screen, a projector, a television, or other device that is operable to display information), and user input device 24 (e.g., a mouse, keyboard, touch-screen, or microphone). The client computing device may also include a camera for recording video streams and/or capturing images, speakers, a network interface device, and all of the components used for connecting these elements to one another.

In addition, the client computing devices 10, 200, 500, 700 may include one or more position and orientation sensors 25. The position and orientation sensors may be configured to determine the position and orientation of a client computing device. For example, these components may include a GPS receiver to determine the device's latitude, longitude and/or altitude as well as an accelerometer, gyroscope or other direction/speed detection device.

Although the client computing devices 10, 200, 500, 700 may each comprise a full-sized personal computing device, they may alternatively comprise mobile computing devices capable of exchanging data with a server, such as server computing device 910, over a network such as the Internet and/or computing devices capable of exchanging data with other computing devices, such as over a network. By way of example only, client computing device 10 may be a mobile phone, wearable device or a device such as a wireless-enabled PDA, tablet PC, or a netbook that is capable of obtaining information via the Internet. In another example, client computing device 200 may be a tablet PC or camera. In an additional example, client computing device 500 may be a laptop computer. In a further example, client computing device 500 may be a tablet PC. Although not shown, the computing devices may be augmented reality and/or virtual reality headsets.

As with memory 914, storage system 950 can be of any type of computerized storage capable of storing information accessible by the server computing devices 910, such as a hard-drive, memory card, ROM, RAM, DVD, CD-ROM, write-capable, and read-only memories. In addition, storage system 950 may include a distributed storage system where data is stored on a plurality of different storage devices which may be physically located at the same or different geographic locations. Storage system 950 may be connected to the computing devices via the network 960 as shown in FIG. 3 and/or may be directly connected to any of the computing devices 10, 200, 500, 700, 910.

Storage system 950, memory 914, as well as computing devices 10, 200, 500, 700, and 910 may each store map data. The stored map data may include any information that may be associated with a map. In one aspect, users 1010, 1020, 1030, 1040 shown in FIG. 4 may use devices 10, 200, 500, 700, to access one or more maps stored on storage system 950 or memory 914. For example, maps 12a and 12b shown in FIGS. 1 and 2, respectively, may be accessed from storage system 950 or server computing device 910 by users 1010, 1020, 1030, 1040 on a client computing device. In some instances, storage system 950, memory 914, as well as computing devices 10, 200, 500, 700, and 910 may store information corresponding to points of interests of a user or points of interest corresponding to locations.

Example Methods

In addition to the operations described herein and illustrated in the figures, various operations will now be described. It should be understood that the following operations do not have to be performed in the precise order described below. Rather, various steps can be handled in a different order or simultaneously, and steps may also be added or omitted.

Figure 2:
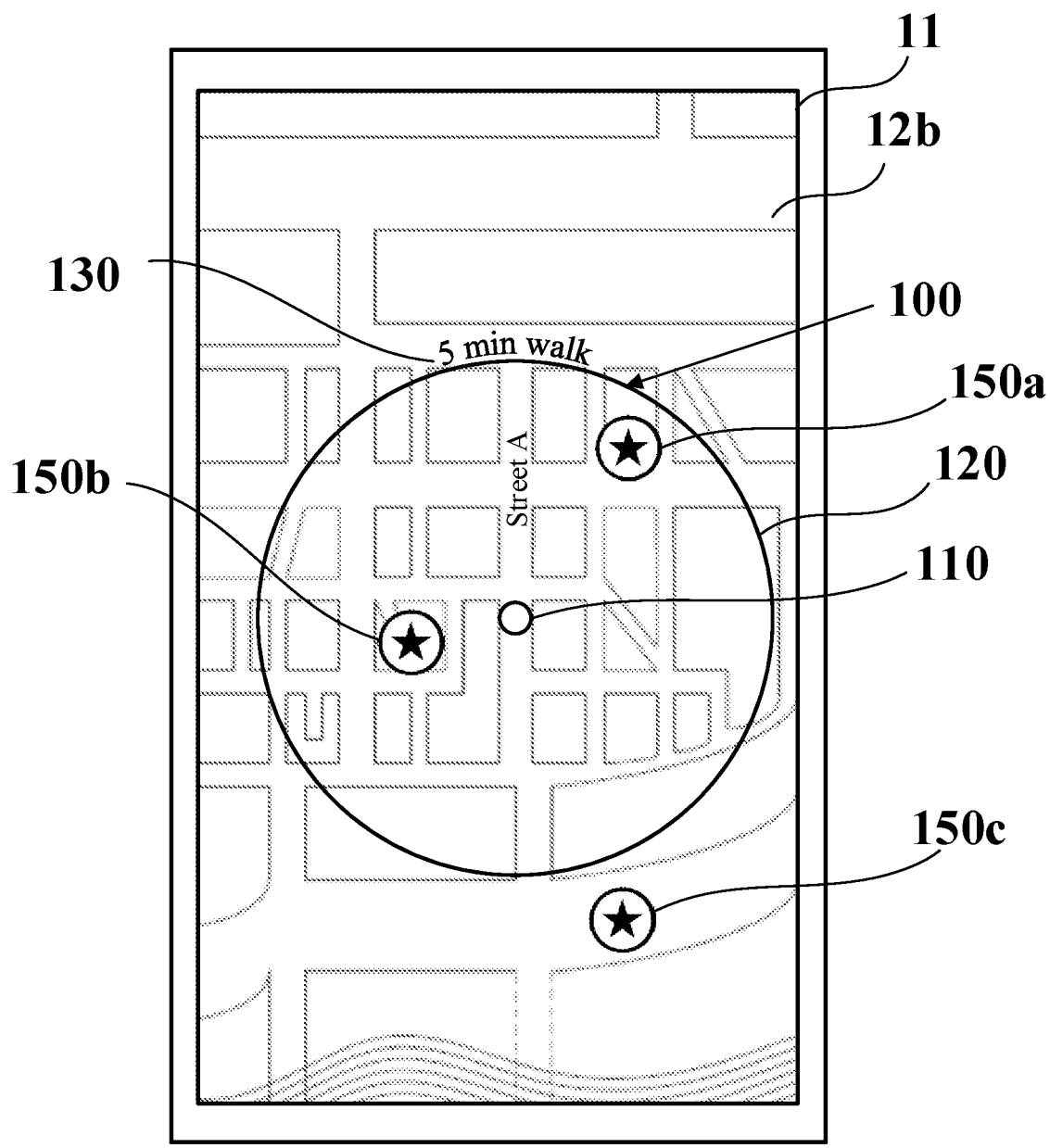
FIG. 2 is an example screenshot displaying a scale ring in accordance with aspects of the disclosure.

As previously described, FIG. 1 depicts a computing device 10 displaying a map 12a. Map 12a is a display of a geographic area and may be displayed upon a query being made by a user, or upon opening up an application or service on computing device 10 and loading a map of a default location or a location of the computing device 10. The location of the computing device may be determined from the device's position and orientation sensors 25.

A number of points of interest ("POI") may be incorporated, or otherwise overlaid on the map 12a. For instance and as further shown in FIG. 1, POIs 150a, 150b, 150c, may be overlaid on map 12a on display 11. The POIs 150a, 150b, 150c may be generated in response to a user query. For instance, where a user has input a user query searching for "restaurants," a server, such as server 910 may reference a storage system, such as storage system 950, to determine of POIs related to restaurants in an area of the device 10 to display in the map 12a. Alternatively, the POI 250 may be locations stored on computing device 10, as discussed above. For example, map 12a may be stored locally on device 10 and may have entries already marked by server 910 or computing device 10 as being noteworthy, such as restaurants, parks, theatres, train stations, or the like.

Once map 12a is displayed on computing device 10, the computing device 10 may receive an input. In this regard, the computing device 10 may receive a user input on display 11, which may be a touch-screen. For instance, an input into computing device 10 may include a user's touch gesture, such as a selection gesture of a particular location on the map or a zoom gesture where a user may use two fingers to pinch or spread a portion of display 11 to adjust a geographic area displayed. Other gestures may include a panning gesture, such as sliding a finger along display 11, a zoom and pan gesture, clicking and dragging with a mouse or stylus, or the like. In other instances, the computing device 10 can receive an input through a user interacting with a different portion of computing device 10, such as a button (not shown). Alternatively, the input may be a detected by one or more processors in the computing device 10 based on data received from the position and orientation sensors 25 of the computing device 10. In this regard, the input may not be provided by a user.

After receiving the input, computing device 10 may send information regarding the input to server 910. This information can include the type of input, such as whether the input is a zoom or pan touch gesture, or a selection of a specific geographical location. The selection of the specific geographical location may, for example, be selected from the displayed geographical area or in response to a user query. The information can additionally include the timing of the input, such as the length of the input and how much time has lapsed since a previous input was received, if there was a previous input.

Based on the information regarding the input, server 910 may send instructions and/or data to computing device 10 to provide an updated or new map corresponding to a different view of the geographic area of map 12*a* or a different geographic area than shown in map 12*a*. For instance, in response to a zoom gesture and based on instructions and/or data received from the server 910, map 12*b* is displayed on computing device 10. Map 12*b* is a zoomed in view of the geographic area of map 12*a*. Alternatively, in response to a selection gesture, an updated map may show a pin or marker at the selected geographic location may be displayed. Although the number of POIs (3) remains consistent between map 12*a* and map 12*b*, in alternative aspects, map 12*b* may have more or fewer POIs corresponding to the changed geographic area of map 12*b*. For instance, there may be less POI where the map is zoomed in or panned to a different geographic area such that certain POI would be outside of display 11.

A scale ring 100, may also be displayed on the map 12*b*. Instructions to display scale ring 100 may be sent from server 910 only upon server 910 receiving information regarding an input or, in alternative aspects, scale ring 100 can be displayed as soon as map 12*a* is instantiated. In this regard, although scale ring 100 is shown as being overlaid map 12*b* in FIG. 2, a scale ring may be displayed on map 12*a* in FIG. 1. In some instances, the scale ring 100 may be displayed based on movement data received from the position and orientation sensors 25 or in response to another input.

The scale ring 100 includes a first inner graphic 110, a second outer graphic 120, and a reference value 130. Inner graphic 110 and outer graphic 120 are shown as being circular and centered on display 11 in FIG. 2. In alternative aspects, inner graphic 110 and/or outer graphic 120 may not be centered in display 11. In this regard, the inner graphic 110 and outer graphic 120 can be displayed on any portion of display 11. In some instances, either or both of inner graphic 110 and outer graphic 120 of scale ring 100 can have other shapes and designs aside from a ring, such as dots and non-circular shapes, including a triangular shapes, rectangular shapes, or any other geometric or non-geometric shapes. In this sense, although the scale is referred to as a scale ring, the scale does not necessarily need to be in the shape of a ring. In a further alternative aspect, scale ring 100 may only include outer graphic 120, without inner graphic 110.

The inner graphic 110 may be centered on a location corresponding to a received input. For instance, in response to a zoom gesture input, computing device 10 may determine a center point or geographic location between where the user is spreading to or from with their fingers. Inner graphic 110 may be displayed on map 12*b* centered upon that center point. In another example, the inner graphic 110 may be centered on a location selected by an input, such as a point selected on the map.

Scale ring 100 and map 12*b* each has their own pixel area—an area of the display contained respectively within scale ring 100 and map 12*b*. For example, the pixel area of the map 12*b* may be the portion of the display on which the map 12*b* is displayed. The pixel area of scale ring 100 may include the area of the display within the outer ring. As shown in FIG. 2, the pixel area of scale ring 100 is around 70% of the pixel area of display 11. However, in alternative aspects, scale ring 100 may make up any proportion of display 11, such as 60%, 80%, or the like. Alternatively, display 111 may not display all of scale ring 100, and only a portion of scale ring 100 may be visible.

The scale ring may include a reference value. For example, and as further shown in FIG. 2, reference value 130 is positioned adjacent to the exterior of outer graphic 120. Alternatively, reference value 130 may sit within the interior of outer graphic 120, or elsewhere on display 11. Reference value 130 may be a numerical unit of measurement representing a geographic characteristic related to travelling from a center of inner graphic 110 to outer graphic 120. As shown in FIG. 2, the geographic characteristic of reference value 130 represents the time (5 minutes) it takes computing device 10 to travel by walking from inner graphic 110 to outer graphic 120.

By referring to reference value 130 and the inner and outer graphics (110, 120), the scale ring 100 provides an approximation of the time it takes to travel from inner graphic 110 to any of POI 150*a*, 150*b*, 150*c*. For instance, POI 150*a* is close to a portion of outer graphic 120 and, thus, would take just less than 5 minutes for user 1010 of computing device 10 to travel to from inner graphic 110. POI 150*b* is roughly halfway between inner graphic 110 and outer graphic 120 and, thus, would take approximately 2.5 minutes for user 1010 of computing device 10 to travel to from inner graphic 110. POI 150*c* is outside of outer graphic 120 and would take more than 5 minutes for user 1010 of computing device 10 to travel to from inner graphic 110. In this manner, scale ring 100 can result in computing device 10 more efficiently displaying distance information with respect to a number of locations, such as POI 150, in relation to a central location, such as inner graphic 110 or in relation to a selected geographic location. In an alternative aspect, reference value 130 is not displayed in minutes and may be in seconds, hours, or any other unit of time.

Reference value 130 may be automatically determined when computing device 10 receives instructions to display scale ring 100. Alternatively, server 910 may determine reference value 130 and may send the numerical value of reference value 130 to computing device 10 with the instructions to display scale ring 100. Reference value 130 can be determined by dividing the geographic distance between inner graphic 110 to outer graphic 120 with a speed of computing device 10, such as a walking speed of the user of computing device 10. For instance, the numeric value of reference value 130 being "5 minutes" may reference where computing device 10 has a speed of 3 miles per hour and outer graphic 120 is approximately 0.25 miles away; thus, reference value 130 displaying the approximation that computing device 10 would take approximately 5 minutes to travel from inner section 110 to outer section 120. The walking speed, or speed of travel, may be determined as discussed below.

In some instances, determining reference value 130 may take into account the road and/or terrain encompassed of map 12*b*. For instance, where Street A is a paved road, reference value 130 may indicate that it takes 5 minutes for a user carrying computing device 10 to travel from inner graphic 110 up Street A to outer graphic 120. In a further alternative aspect, where Street A is not paved, such as being a hilly or gravelly terrain, reference value 130 may display more time, such as 10 minutes, as it may take a user, such as user 1010 carrying computing device 10 longer to traverse such uneven terrain. By taking account of the terrain, a more accurate speed of travel may therefore be provided for use in the methods described herein.

The speed of computing device 10 may be determined by, for instance, a user inputting a certain speed into computing device 10, server 910 providing computing device 10 with a default speed, such as 3 miles per hour, or a server averaging the speed of computing device 10 over a period of use. In some instances, the position and orientation sensors 25 may provide the speed of the computing device or data corresponding to the speed of the computing device 10.

Alternatively or additionally, the speed may be determined based on a machine learning process. In this method, a server may set an initial speed prediction of computing device 10. The initial speed predication may be based on historical speeds in a location. Then, as computing device 10 travels from inner graphic 110 to outer graphic 120, server 910 may determine how accurate the initial speed prediction was and adjust for a new speed prediction. This can be repeated so that each new speed prediction of the server is closer and closer to the actual speed of computing device 10. In this manner, server 910 can learn the most accurate speed of computing device 10 through having more accurate predictions at each iteration. By using previous locations and other data associated with a user in this way, a more accurate speed of travel may therefore be provided for use in the methods described herein.

The historical speeds in a location may be historical speeds of a user traversing similar terrain to the user's present location, in which case the model may also take into account the streets or terrain computing device 10 has to travel over, as discussed above. For example, a server may initially predict that computing device 10 may take 5 minutes to travel 0.25 miles, as shown on scale ring 100 in FIG. 2. However, if computing device 10 takes shorter or longer than 5 minutes, server 910 may adjust the speed prediction in the next iteration to be correspondingly shorter or longer. This process can be repetitively iterated until the predicted speed is within an acceptable error threshold over a period of use. For instance, the machine learning process may stop once the predicted speed is within plus or minus 5% of the detected speed for 10 consecutive iterations. Alternatively, this machine learning process can be run for every instance of displaying scale ring 100 and reference value 130. Through this process, the server may detect the most accurate speed of computing device 10 and display the time of travel from inner graphic 110 to outer graphic 120 for computing device 10 with a high degree of accuracy.

Scale ring 100 may be displayed on, and/or removed from, map 12b with a transition animation. For instance, after server 910 has sent instructions to computing 10 to display scale ring 100, server 910 may provide further instructions for computing device 10 to display scale ring 100 with a fade transition such that scale ring 100 has an initial transparency and gradually becomes more opaque over a first transition period, until scale ring 100 is displayed with no transparency, as shown in FIG. 1.

Additionally or alternatively, server 910 may provide instructions for scale ring 100 to have a fade transition when being removed from map 12b such that scale ring 100 grows increasingly transparent over a second transition period until scale ring 100 is completely removed from map 12b. The first and second transition periods of this transition animation may be 0.3 seconds. In alternative aspects, the transition period may be any period of time, such as 0.1 seconds, 0.2 seconds, 0.5 seconds, or the like. Alternatively, there may be no transition period or animation, and scale ring 100 is immediately displayed upon computing device 10 receiving the appropriate instructions from server 910. In a further alternative aspect, scale ring 100 may fade in over a first transition period, such as 0.3 seconds, that is different than when scale ring 100 fades out over a second transition period, such as 0.5 seconds.

In another aspect, server 910 may provide instructions for transition animations for displaying scale ring 100 by having outer graphic 120 gradually and concentrically grow from inner graphic 110 over a transition period until scale ring 100 covers a certain pixel area of map 12b. Additionally, server 910 may send instructions to remove scale ring 100 by concentrically shrinking scale ring 100 until scale ring 100 is completely removed from map 12b. In an alternative aspect, scale ring 100 can have any combination of transition animations of fading and growing/shrinking. For instance, scale ring 100 can have a fading transition animation when being displayed on map 12b and have a shrinking animation when being removed from map 12b. In a further alternative aspect, the scale ring may not have a transition animation and only the reference value may be updated. For instance, after a further input is detected, scale ring 100 can maintain its pixel area with respect to an updated map (not shown) while reference value 130 is updated to reflect the geographic characteristic between inner graphic 110 and outer graphic 120 on the new map.

Additionally, server 910 may instruct computing device to provide scale ring 100 with a residence period after being displayed such that scale ring 100 remains displayed on map 12b for a period of time before being removed. For instance, scale ring 100 may be displayed on display 11 for 1.5 seconds before being removed. In alternative aspects, the residence period may be any period of time, such as 1 second, 1.2 seconds, 2 seconds, or the like. Alternatively, scale ring 100 may have no residence period and may remain displayed on display 11 indefinitely, or until computing device 10 receives specific instructions to remove scale ring 100, such as from a user enabling a setting or hitting a prompt.

The residence period may be reset upon server 910 receiving further information of an input. Upon the residence period being reset, the scale ring 100 may be maintained or displayed again for the residence period starting at the time the residence period was reset. In an alternative aspect, the residence period may be different for different types of inputs. For instance, a zoom touch gesture may set a residence period of 1 second while a pan gesture may set a residence period of 1.5 seconds. In this manner, map 12b may be altered to display a new geographic area (not shown) while scale ring 100 remains displayed on the new map when the server receives information regarding further input within the residence period.

Figure 6:
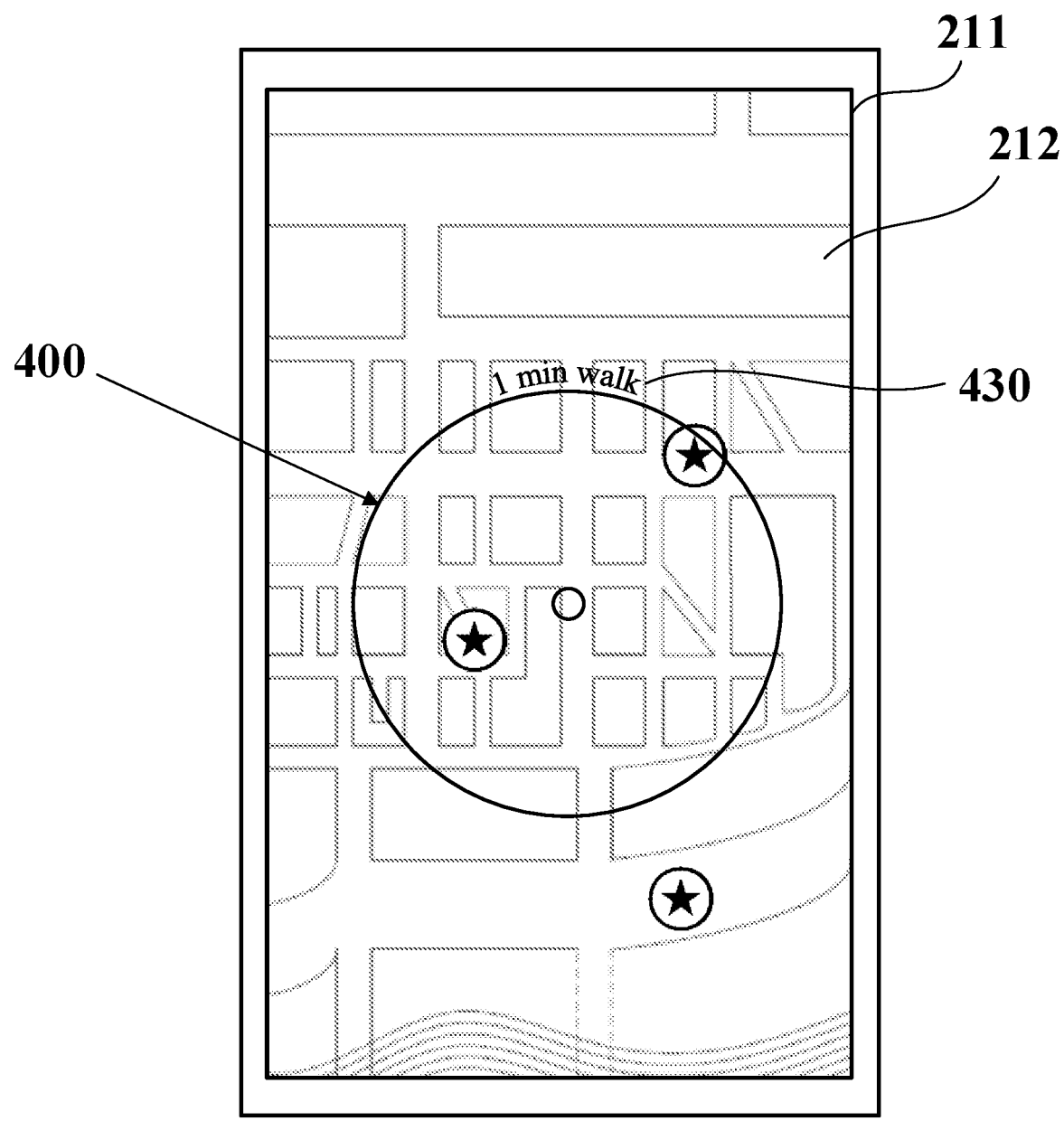
FIG. 6 is a screenshot depicting another example transition of a scale ring according to aspects of the disclosure.

In a further alternative aspect, server 910 may instruct computing device 10 to replace scale ring 100 with a new scale ring upon receiving information regarding further inputs. For instance, FIGS. 5-6 depicts where server 910 receives further input information from computing device 200. Server 910 has sent computing device 200 instructions to display new map 212 from a previous map (not shown), and to replace scale ring 300 with scale ring 400.

FIG. 5 depicts scale ring 300 and reference value 330 being removed from map 212 through a fade-out transition animation, and scale ring 400 and updated reference value 430 being displayed on map 212 through a fade-in transition animation. Scale ring 300 and scale ring 400 have different pixel areas with respect to map 212 as the pixel area of scale ring 300 maintains its original ratio with respect to the pixel area of the previous map (not shown) prior to the user's zoom gesture while scale ring 400 has a pixel area of substantially 70% of a pixel area of map 212.

FIG. 6 depicts scale ring 300 having been completely removed from map 212, and scale ring 400 having finished the transition animation and being completely opaque. In an alternative aspect, scale rings 300, 400 may replace each other through a growing/shrinking transition, or a combination of a fading and growing/shrinking, as described above.

Figure 7:
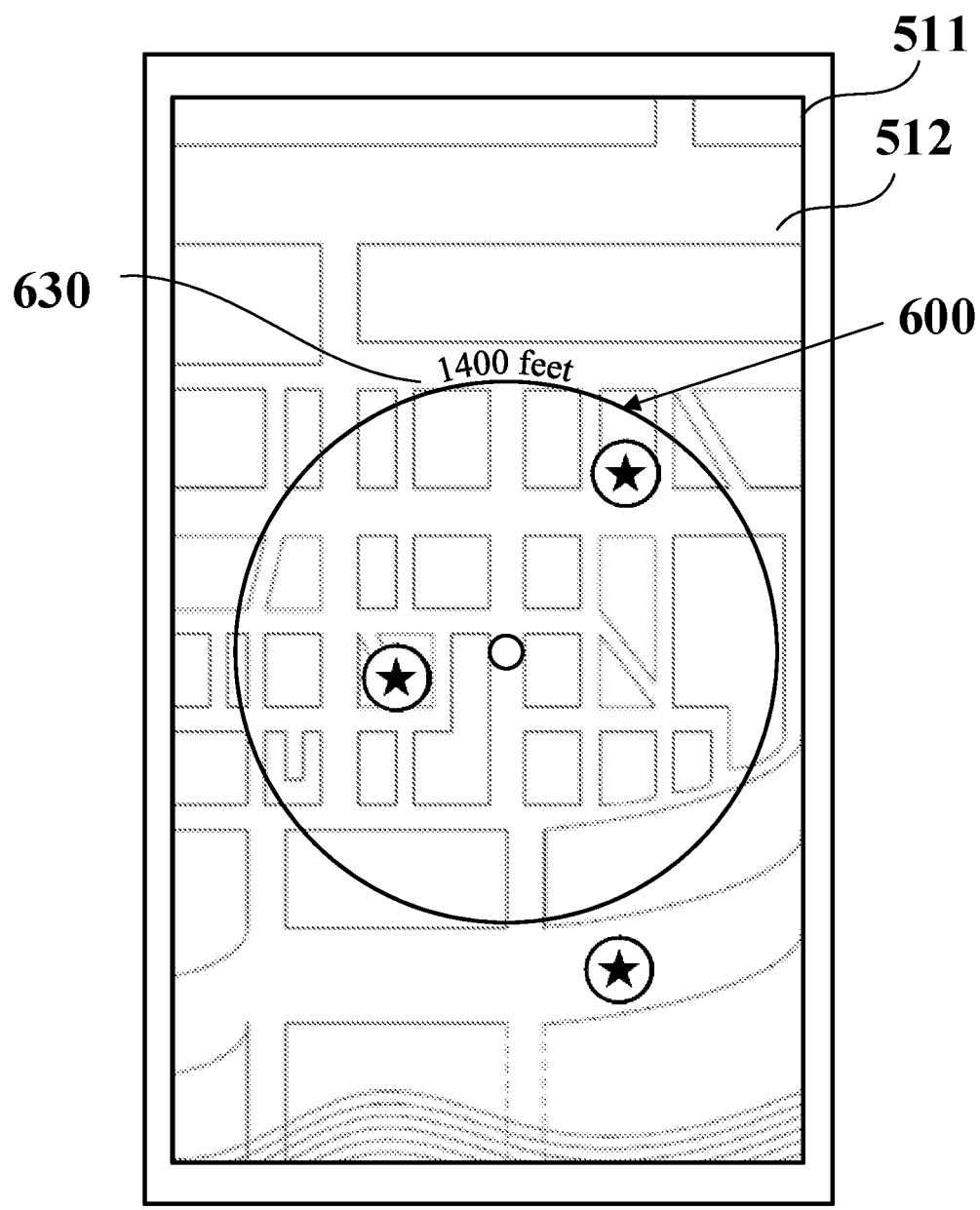
FIG. 7 is another example screenshot depicting a scale ring according to one aspect of the disclosure.
Figure 8:
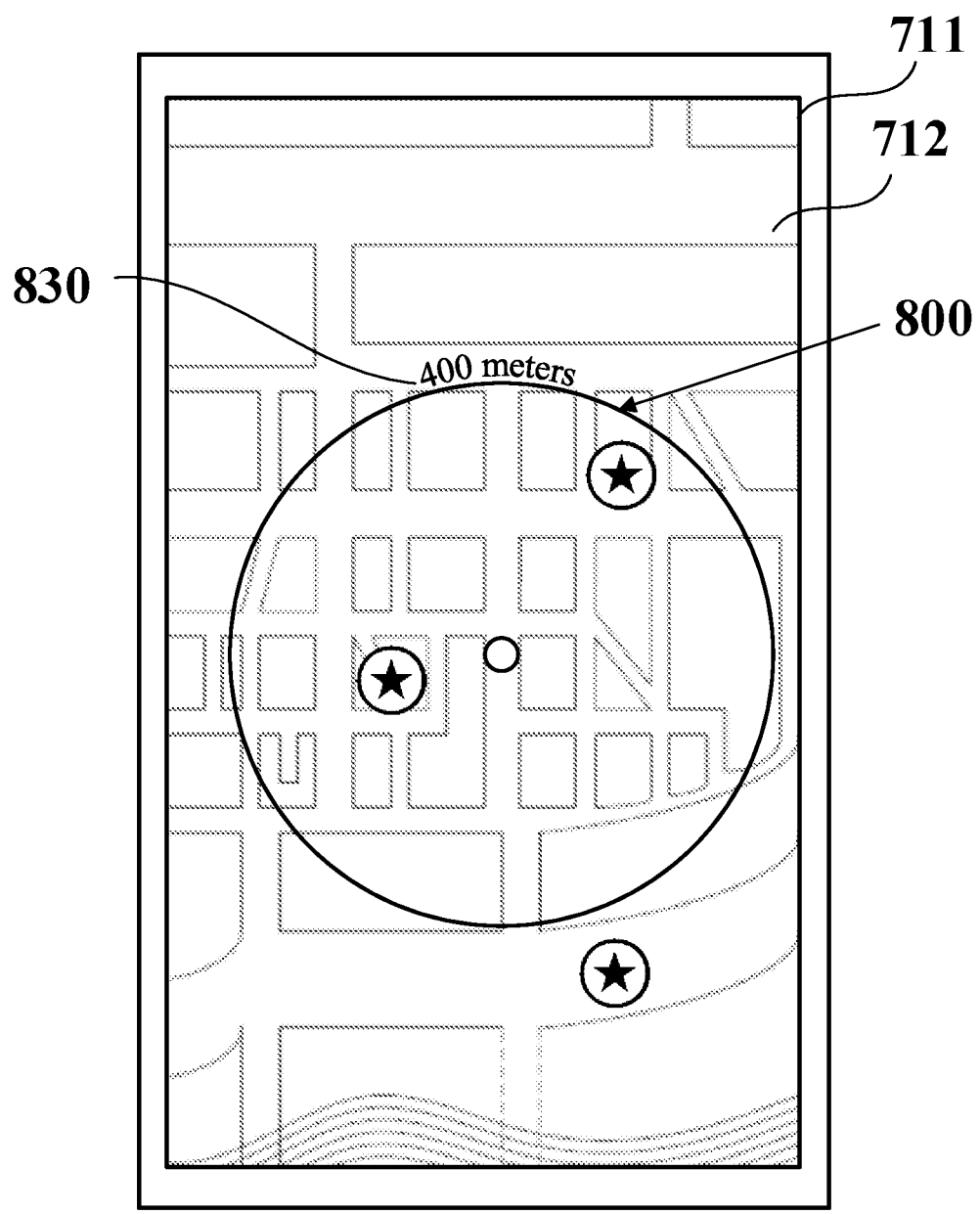
FIG. 8 is another example screenshot depicting a scale ring according to one aspect of the disclosure.

In alternative aspects, the server may instruct the computing device to display the reference value as a geographic distance rather than as a unit of time. For instance, FIG. 7 depicts where a server has instructed computing device 500 to display scale ring 600 on map 512 on display 511. In this aspect, reference value 630 of scale ring 600 is in feet. In an alternative aspect, FIG. 8 depicts where a server has instructed computing device 700 to display scale ring 800 on map 712 on display 711. In this aspect, reference value 830 of scale ring 800 is in meters. In an alternative aspect, reference value 630, 830 may display any unit of geographic distance, including in kilometers, yards, or the like. In further alternative aspects, any of the above reference values may display both units of time and distance adjacent the outer graphic of the scale ring.

Figure 9:
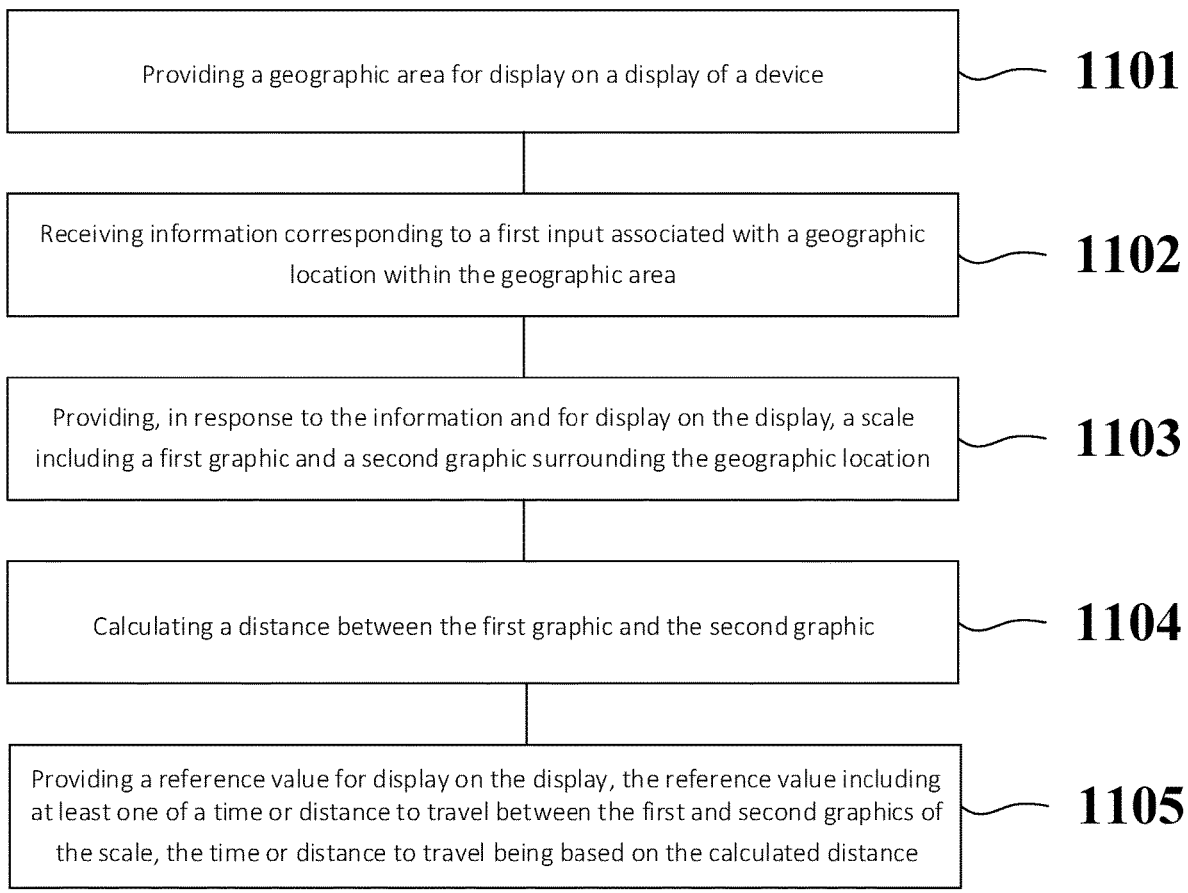
FIG. 9 is an example flowchart depicting the method in accordance with aspects of the disclosure.

FIG. 9 depicts an example flowchart describing a method for displaying a scale ring. In step 1101, a server, such as server 910, may provide a geographic area or map for display on a display of a device, such as display 11 of computing device 10. The map may display a current location of the computing device. Alternatively, the map may display a geographic location related to a user query received by the computing device.

In step 1102, the server may receive information corresponding to a first input associated with a geographic location within the geographic area. This first input can be a first user input to the display, where the display is a touch or presence sensitive display, for example. In another example, the first input may be any other means, such as input by a keyboard, mouse, gesture, etc. This first input associated with a geographic location within the geographic area can be an input to adjust the geographic area for display on the device, or to select a specific geographic location within the geographic area, for example, in response to a user query for a particular location. This first input can be one of a zoom or pan gesture to adjust the geographic area. In one aspect, upon receiving the first input, the computing device can send information regarding the input to the server connected to the computing device through a communications network.

In step 1103, the server may provide, in response to the information and for display on the display of the computing device, a scale including a first graphic and a second graphic surrounding the geographic location. For example, after the computing device has sent the server information regarding the input, the server may send the computing device instructions to display the scale corresponding to the information about the input. The first graphic (or inner graphic) can be a pin, circle or other marker arranged at the selected geographic location, or positioned at a geographical location in the center of the geographical area, for example. The second (or outer) graphic can surround the inner graphic, and thus surround the geographic location.

In step 1104, the server may calculate the distance between the first graphic and the second graphic. For instance, the server may calculate the distance based on data of the geographic area stored within the memory or a storage system connected to the server through the communications network.

In step 1105, the server may provide a reference value for display on the display of the computing device, the reference value including at least one of a time or distance to travel between the first and second graphics of the scale, the time or distance to travel being based on the calculated distance. The reference value can be automatically determined upon the scale being displayed. For example, the server may send instructions to determine and display the reference value simultaneously with the instructions for displaying the scale.

It should be understood that the above steps can be performed by a computing device without being in communication with, or connected to, a server. Such a computing device would have the data and instructions to perform the steps stored locally within the memory of the computing device. For instance, the computing device may display a map on a display based on geographic data stored locally within the computing device. The computing device may then receive an input associated with the map, for instance, along a display of the computing device. In response to the input, the computing device may execute instructions to display a scale ring, calculate a distance of an inner and outer graphic of the scale ring, and display a reference value on the map. The instructions and graphical data for the scale ring, calculation, and reference value may be stored within the computing device. The instructions may include calculating the reference value as well as displaying the scale ring with transition animations as discussed above.

Although the subject matter herein has been described with reference to particular examples, it is to be understood that these examples are merely illustrative of the principles and applications of the subject matter described. It is therefore to be understood that numerous modifications may be made and that other arrangements may be devised without departing from the spirit and scope as defined by the appended claims.

The invention claimed is:

1. A method for updating a map scale comprising:
providing, by one or more processors, a geographic area for display on a display of a device and a first scale centered within the geographic area;
receiving, by the one or more processors, update information corresponding to an input associated with an updated view of the geographic area, the updated view corresponding to a zoom or pan of the geographic area or a centering of a selected point within the geographic area;
providing, in response to the update information and for display on the display, by the one or more processors, an updated scale including a graphic at least partially surrounding a point associated with the input within the updated view of the geographic area, the updated scale recentering the first scale to conform with the updated view of the geographic area;
calculating, by the one or more processors, an updated distance for the updated scale compared to a previous distance associated with the previous scale; and
providing, by the one or more processors, an updated reference value for display on the display, the updated reference value including at least one of a time or distance to travel based on the updated distance.

2. The method of claim 1, wherein the graphic surrounds the point associated with the input within the updated view of the geographic area based on a predetermined proportion of the display.

3. The method of claim 1, wherein the graphic is a ring concentrically surrounding the point associated with the input within the updated view of the geographic area.

4. The method of claim 1, wherein the point associated with the input within the updated view of the geographic area is positioned at a center of the geographic area.

5. The method of claim 1, further comprising determining, by the one or more processors, the updated reference value by:
    determining a speed of travel; and
    determining an estimated time to travel between the graphic and the point associated with the input within the updated view of the geographic area based on the speed of travel.

6. The method of claim 5, wherein determining the speed of travel is based on data associated with a user of the device.

7. The method of claim 6, wherein determining the speed of travel further comprises applying a machine learning model to the data associated with the user of the device.

8. The method of claim 1, further comprising removing, by the one or more processors, the previous scale in response to providing the updated scale and reference value.

9. The method of claim 8, wherein the previous scale is configured to fade out over a period of time.

10. The method of claim 8, wherein the previous scale is configured to cease being displayed on the display after a period of time.

11. A system comprising:
    one or more processors; and
    one or more storage devices coupled to the one or more processors and storing instructions that, when executed by the one or more processors, cause the one or more processors to perform operations for updating a map scale, the operations comprising:
        providing a geographic area for display on a display of a device and a first scale centered within the geographic area;
        receiving update information corresponding to an input associated with an updated view of the geographic area, the updated view corresponding to a zoom or pan of the geographic area or a centering of a selected point within the geographic area;
        providing, in response to the update information and for display on the display, an updated scale including a graphic at least partially surrounding a point associated with the input within the updated view of the geographic area, the updated scale recentering the first scale to conform with the updated view of the geographic area;
        calculating an updated distance for the updated scale compared to a previous distance associated with the previous scale; and
        providing an updated reference value for display on the display, the updated reference value including at least one of a time or distance to travel based on the updated distance.

12. The system of claim 11, wherein the graphic surrounds the point associated with the input within the updated view of the geographic area based on a predetermined proportion of the display.

13. The system of claim 11, wherein the graphic is a ring concentrically surrounding the point associated with the input within the updated view of the geographic area.

14. The system of claim 11, wherein the point associated with the input within the updated view of the geographic area is positioned at a center of the geographic area.

15. The system of claim 11, wherein the operations further comprise determining the updated reference value by:
    determining a speed of travel; and
    determining an estimated time to travel between the graphic and the point associated with the input within the updated view of the geographic area based on the speed of travel.

16. The system of claim 11, wherein the operations further comprise removing the previous scale in response to providing the updated scale and reference value.

17. The system of claim 16, wherein the previous scale is configured to fade out over a period of time.

18. The system of claim 16, wherein the previous scale is configured to cease being displayed on the display after a period of time.

19. A non-transitory computer-readable medium for storing instructions that, when executed by one or more processors, cause the one or more processors to perform operations for updating a map scale, the operations comprising:
    providing a geographic area for display on a display of a device and a first scale centered within the geographic area;
    receiving update information corresponding to an input associated with an updated view of the geographic area, the updated view corresponding to a zoom or pan of the geographic area or a centering of a selected point within the geographic area;
    providing, in response to the update information and for display on the display, an updated scale including a graphic at least partially surrounding a point associated with the input within the updated view of the geographic area, the updated scale recentering the first scale to conform with the updated view of the geographic area;
    calculating an updated distance for the updated scale compared to a previous distance associated with the previous scale; and
    providing an updated reference value for display on the display, the updated reference value including at least one of a time or distance to travel based on the updated distance.

20. The non-transitory computer-readable medium of claim 19, wherein the graphic surrounds the point associated with the input within the updated view of the geographic area based on a predetermined proportion of the display.

* * * * *